(No Model.)
H. BREER.
APPARATUS FOR DESICCATING ANIMAL MATTER FOR FERTILIZERS.
No. 280,790. Patented July 10, 1883.
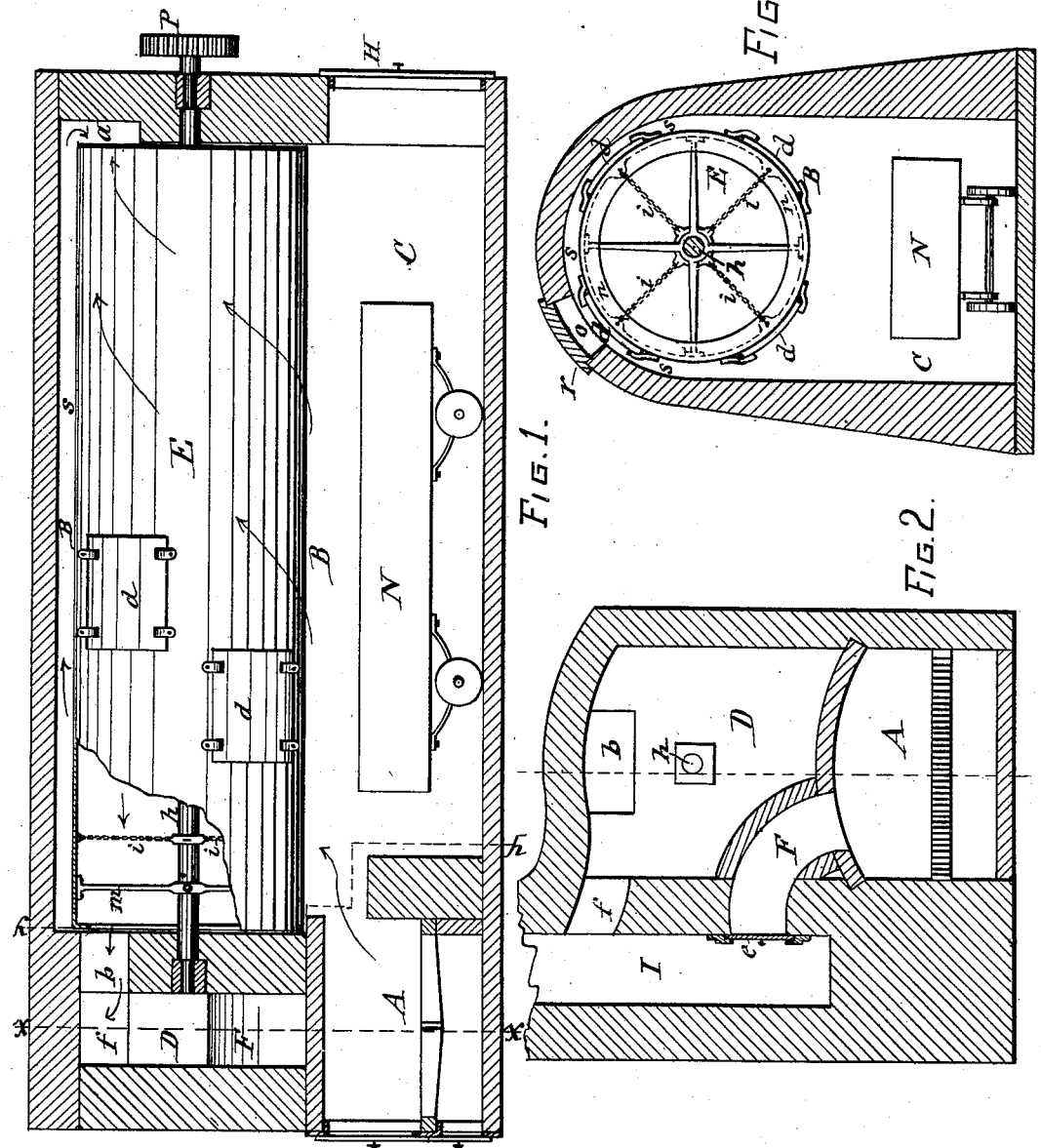
WITNESSES:
INVENTOR:
Henry Breer

UNITED STATES PATENT OFFICE.

HENRY BREER, OF DE WITT, NEW YORK, ASSIGNOR TO CAROLINE H. BREER, OF SYRACUSE, NEW YORK.

APPARATUS FOR DESICCATING ANIMAL MATTER FOR FERTILIZERS.

SPECIFICATION forming part of Letters Patent No. 280,792, dated July 10, 1883.

Application filed November 25, 1882. (No model.)

*To all whom it may concern:*

Be it known that I, HENRY BREER, of De Witt, in the county of Onondaga, in the State of New York, have invented new and useful Improvements in Apparatus for Desiccating Animal Matter for Fertilizers, of which the following, taken in connection with the accompanying drawings, is a full, clear, and exact description.

This invention relates to that class of desiccating apparatus in which a cylindrical receptacle for the substance to be desiccated is arranged for rotary operation in a combustion-chamber and is surrounded by the products of combustion and has the same passing longitudinally through it.

The objects of my present invention are to retard the escape of the products of combustion from the combustion-chamber and desiccating-cylinder, and thus more effectually utilize the heat, and also to facilitate the cooling of the cylinder when desired for discharging and replenishing the desiccating-cylinder; also, to facilitate the removal of the desiccated substance discharged from the cylinder, and, further, to provide more effective means for agitating and breaking up the substance under treatment; and to that end my present invention consists in the improved construction and combination of certain essential parts of the apparatus, as hereinafter more fully described, and specifically set forth in the claims.

Referring to the annexed drawings, Figure 1 is a longitudinal section of the structure inclosing the desiccating-cylinder, a portion of the latter being broken away to illustrate the internal arrangement of said cylinder. Fig. 2 is a vertical section on line $x\,x$, and Fig. 3 a vertical section on line $y\,y$.

Like letters of reference denote like parts in all the figures.

A represents a furnace or fire-box communicating with a prolonged horizontal combustion-chamber, B, in which is arranged horizontally the desiccating-cylinder E, which is extended the length of the combustion-chamber, and has its two ends fitted closely thereto, so as to retain the substance under treatment within the cylinder, the ends of which are open from the center to nearly the periphery thereof, a circumferential flange, $n$, around the latter serving as a guard to prevent the contents of the cylinder from working out between the end of the cylinder and the end walls of the combustion-chamber. The cylinder E is supported by means of spiders, $m$, attached to a shaft, $h$, which is extended longitudinally through the cylinder, and journaled in suitable bearings in the end walls of the combustion-chamber, and has one end extended through the rear end wall and secured to its outer end either a pulley or pinion, P, by which the cylinder receives its rotary motion from a suitable power connected with said pinion in any suitable and well-known manner.

In lieu of the wire-nettings and the plain rods heretofore extended radially across the interior of the cylinder E, for the purpose of stirring and breaking up the substance under treatment, I now employ chains $i\,i$, arranged in a similar manner across the cylinder, which I find to be more effective for the aforesaid purpose. The cylinder E is provided in its side with the usual doors, $d\,d$, through which to introduce and remove the substance to and from the cylinder. Suitable openings, $o$, are made in or near the crown of the combustion-chamber, and provided with removable covers, $r$, to obtain access to the doors $d$ of the cylinder for removing them and introducing into the cylinder substances to be treated. A cellar or bottom chamber, $c$, is formed under the cylinder by an extension of the combustion-chamber, said bottom chamber being provided with a door, H, through which to enter a truck or car, N, into which to dump the desiccated matter from the cylinder through its removed doors $d$, the door H being closed during the process of desiccating for obvious reasons.

In order to allow the products of combustion to circulate around the exterior of the cylinder E, and thence pass longitudinally through the same, I construct the combustion-chamber sufficiently wide and high to form a space, $s$, around the cylinder, and the upper part of the rear end of the combustion-chamber I form with a nook or recess, $a$, which communicates, respectively, with the space $g$ and with the upper portion of the opening in the end of the cylinder. The opposite or forward end of the combustion-chamber I provide with an exit, $b$, for the products of combustion, said exit leading to a smoke-box, D, built over the furnace A; and this smoke-box has in its side an opening, $f$, by which it communicates with the chimney I, built on the side of the apparatus, as shown in Fig. 2 of the drawings.

In order to admit of quickly cooling the cylinder to obtain access thereto for emptying and charging the same, I form a direct flue, F, from the top of the furnace A to the chimney I, and provide said flue with a suitable damper, $e$, as seen in Fig. 2 of the drawings. It will be observed that by opening the flue F the products of combustion will rush from the furnace directly to the chimney, and thus allow the cylinder E to cool.

Having described my invention, what I claim as new, and desire to secure by Letters Patent, is—

1. The rotary cylinder E, having its two ends open nearly or quite to the periphery thereof, in combination with the combustion-chamber B, formed with a space, $s$, around the cylinder and fitted close to the ends of said cylinder from the bottom to a line above the axis of the same, and provided at the upper part of its rear end with the nook or recess $a$ and at the upper part of its opposite end with the exit $b$, substantially as described and shown.

2. In combination with the combustion-chamber B and the cylinder E, arranged in said combustion-chamber, and provided with doors $d\ d$, as shown, the bottom chamber, C, formed of an extension of the combustion-chamber, and provided with a door, H, substantially as described and shown, for the purpose set forth.

3. In combination with the furnace A, cylinder E, and the combustion-chamber B, provided with the exit $b$, the smoke-box D, direct-flue F, damper $e$, and the chimney I, provided with the opening $f$, and communicating with the flue F, all combined and arranged substantially as described and shown, for the purpose set forth.

In testimony whereof I have hereunto signed my name and affixed my seal, in the presence of two attesting witnesses, at Syracuse, in the county of Onondaga, in the State of New York, this 3d day of November, 1882.

HENRY BREER. [L. S.]

Witnesses:
C. H. DUELL,
WM. C. RAYMOND.